United States Patent [19]
Feeley et al.

[11] Patent Number: 5,734,926
[45] Date of Patent: Mar. 31, 1998

[54] DIRECT MEMORY ACCESS CONTROLLER IN AN INTEGRATED CIRCUIT

[75] Inventors: Peter S. Feeley; Kenneth J. Baker, both of Moscow, Id.

[73] Assignee: Advanced Hardware Architectures, Pullman, Wash.

[21] Appl. No.: 451,431

[22] Filed: May 26, 1995

Related U.S. Application Data

[63] Continuation of Ser. No. 913,845, Jul. 15, 1992, abandoned.
[51] Int. Cl.[6] .................................................... G06F 13/14
[52] U.S. Cl. .......................... 395/848; 395/730; 370/450; 370/462
[58] Field of Search ................................... 395/441, 404, 395/405, 476, 484, 495, 848, 856, 730; 370/462, 450

[56] References Cited

U.S. PATENT DOCUMENTS

| | | | |
|---|---|---|---|
| 4,551,721 | 11/1985 | Kozlik | 340/825.52 |
| 4,819,229 | 4/1989 | Pritty et al. | 370/89 |
| 4,951,280 | 8/1990 | McCool et al. | 370/85.12 |
| 4,989,113 | 1/1991 | Hull, Jr. et al. | 364/200 |
| 5,099,417 | 3/1992 | Magar et al. | 395/847 |
| 5,153,884 | 10/1992 | Locak et al. | 371/32 |
| 5,206,943 | 4/1993 | Callison | 395/441 |
| 5,280,591 | 1/1994 | Garcia et al. | 395/325 |
| 5,297,258 | 3/1994 | Hale et al. | 395/441 |
| 5,301,297 | 4/1994 | Menon et al. | 395/441 |
| 5,313,454 | 5/1994 | Bustini et al. | 370/13 |
| 5,394,532 | 2/1995 | Belsan | 395/441 |
| 5,404,487 | 4/1995 | Murata et al. | 395/441 |
| 5,454,085 | 9/1995 | Gajjar et al. | 395/441 |

Primary Examiner—David L. Robertson
Attorney, Agent, or Firm—Haverstock & Associates

[57] ABSTRACT

A direct memory access controller controls many direct memory access ports using a token passing scheme. The system multiplexes the port's accesses to external random access memory by daisy-chaining a loop of direct access memory ports and passing the token around to each port. Once a port receives the token it may request as many random access memory accesses as it requires. These accesses may be either read operations or write operations with both using the same multiplexed data bus. The latency inherent in reading an external RAM causes no loss in the access efficiency. When the port has completed its data transfer or if the port does not require a data transfer, the token is passed to the next direct memory access port for its data transfer. The token is passed around to all connected ports until all have had an opportunity to complete any memory transfers which they required. Each port is identical except for a binary identification code that is used to represent each port. The system can accommodate as many ports as necessary and additional ports can be added at a subsequent time.

32 Claims, 3 Drawing Sheets

DIRECT MEMORY ACCESS CONTROLLER IN AN INTEGRATED CIRCUIT

This is a File Wrapper Continuation of copending application Ser. No. 07/913,845 filed on Jul. 15, 1992, abandoned.

FIELD OF THE INVENTION

This invention relates to the field of direct memory access systems particularly those systems which multiplex access to external random access memories using a token passing scheme.

BACKGROUND OF THE INVENTION

Direct memory access (DMA) is a technique that is used to allow various I/O devices to store data in and read data from a random access memory (RAM) while the CPU is performing other tasks. Direct memory access allows the I/O devices to bypass the CPU and interact with the RAM directly. A direct memory access system can be structured so that it has its own channel directly to the memory or alternatively the DMA system can share the same channel with the CPU, taking advantage of the address bus, the data bus, and the control bus used by the CPU. If the DMA system is using the channel to access the data memory, the CPU is free to perform its own programmed tasks as long as it does not need to access the data memory or use the busses.

There are many operations that a CPU must perform which do not require access to the memory, but instead require it to perform a process on a word, or words, already within its internal registers, such as an ADD operation or a SHIFT operation. During the time that the CPU is busy performing these other operations the DMA system can perform a transfer of data between the RAM and an I/O device. This DMA transfer can occur in the form of either a read operation or a write operation.

Another way that the DMA system can gain access to the memory is by using a method called cycle stealing. Using this method if an I/O device connected to the DMA system wishes to access memory it initiates a DMA request signal. When the CPU receives this signal it completes its current instruction and suspends operation or idles for the next clock cycle. When the DMA transfer is complete the CPU then resumes its normal programmed operation. This method is not as efficient as the first because the CPU does not perform additional tasks while a cycle stealing DMA transfer takes place but rather sits and waits until the transfer is complete.

Many I/O devices can be connected to one DMA controller as components of the DMA system. Each device may require access to RAM at different times or at the same time. When more than one device requests access to RAM at the same time, the system must employ some method to choose which device will be given access to the memory first. One such method is to assign priorities to the devices connected to the DMA controller, so that the device with the highest priority will be given access to the RAM first. If there is time left after a higher priority device accesses the RAM, then a lower priority device will be given access to the RAM after the higher priority device has completed its transfer.

The DMA transfer can continue for a programmed period of time, until the transfer is complete, or until the CPU requires access to the memory. Once the transfer is ended for any of the above reasons, control of the memory access channel reverts back to the CPU until it no longer requires access and the DMA system has requested a transfer, or in some cases until the DMA controller is able to steal a cycle to perform another transfer.

What is needed is a direct memory access transfer system which allows access to external memory by multiple ports, each port in turn. The system's architecture should easily accommodate future expansion. Further, a direct memory access transfer system is needed which will allow each port to perform as many data transfers as it requires before the next port is allowed access to the external memory.

SUMMARY OF THE INVENTION

A direct memory access controller controls many direct memory access ports using a token passing scheme. The system multiplexes the port's accesses to external random access memory by daisy-chaining a loop of direct access memory ports and passing the token around to each port. Once a port receives the token it may request as many random access memory accesses as it requires. These accesses may be either read operations or write operations with both using the same multiplexed data bus. The latency inherent in reading an external RAM causes no loss in the access efficiency. When the port has completed its data transfer or if the port does not require a data transfer, the token is passed to the next direct memory access port for its data transfer. The token is passed around to all connected ports until all have had an opportunity to complete any memory transfers which they required. Each port is identical except for a binary identification code that is used to represent each port. The system can accommodate as many ports as necessary and additional ports can be added at a subsequent time.

DETAILED DESCRIPTION OF THE PREFERRED EMBODIMENT

Figure 1:
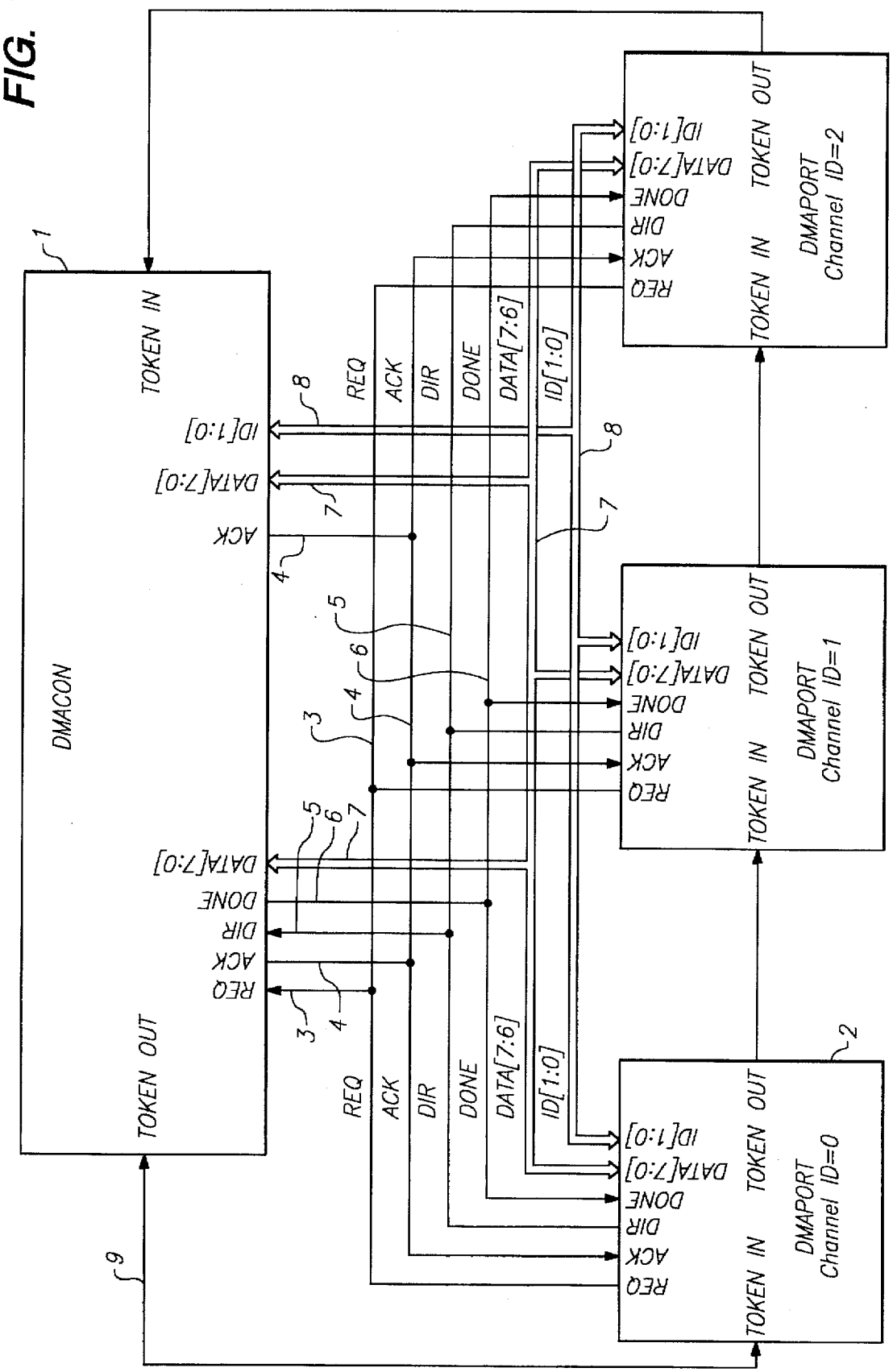
FIG. 1 is a block diagram of a typical direct memory access data transfer system according to the present invention having one controller and three connected direct memory access ports.

The direct memory access controller for an integrated circuit of the preferred embodiment is made up of one direct memory access controller (DMACON) and many direct memory access ports (DMAPORTs) as shown in FIG. 1. The DMAPORTS 2 and the DMACON 1 are daisy-chained together by the token signal line 9 and also connected by a request line 3, (REQ), an acknowledge line 4, (ACK), a direct memory access done line 6, (DONE), an identification number bus 8, (ID), a bi-directional data bus 7, (DATA), and a direction of current transfer line 5 (DIR).

Each DMAPORT 2 is identical with the exception of an identification number that is used to represent each port individually. This identification number is a binary representation of the particular port's identification number which is programmed by connections to either power or ground and is carried by the identification number bus 8 to the DMACON 1 during data transfers. The size of the identification number bus 8 will vary depending on the number of ports that are connected to the DMACON 1, but must be big enough to carry the binary representation of each port's identification number. For example, the system shown in FIG. 1 has three DMAPORTs 2. Therefore to fully represent each port's identification number, the ID bus 8 must be at least two bits wide, but if two more DMAPORTs 2 were added to the system the ID bus 8 would have to be expanded to at least three bits. The width of the bi-directional data bus 7 can also vary depending on what size is most convenient, works most efficiently and what size the data blocks are that are to be transferred. The system shown in FIG. 1 has an eight bit wide bi-directional data bus.

Each module on the integrated circuit requiring access to an external random access memory interfaces with the DMA system through a DMAPORT 2. The DMAPORT 2 then handles the mechanics of the particular read or write operation with the RAM and transfers the data through the DMACON 1.

The DMACON 1 controls the frequency of RAM accesses by the DMAPORTS 2 with one clock cycle pulses on the acknowledge signal line 4 (ACK). The clock cycle following ACK 4 rising from a low potential to a high potential is reserved for a read operation and the clock cycle following ACK 4 falling from a high potential to a low potential is reserved for a write operation. The DMACON 1 also maintains and updates the RAM addresses and byte transfer counts for each of the DMAPORTs 2.

The DMAPORTs 2 time-multiplex access to the DMACON 1, and therefore the RAM itself by using a token passing scheme. A token is passed around the loop such that the DMAPORT 2 with the token is allowed sole access to the DMACON 1 and the external memory. The DMAPORT 2 can keep the token for as long as it requires to complete its data transfer. When the DMAPORT 2 completes its required RAM access, it passes the token to the next DMAPORT 2 in the daisy-chained loop. The signal lines REQ 3 and ACK 4 are used to control the timing of this scheme and to determine the location of the token at any one time.

During reset of the system, the token is generated by the DMACON 1 and passed along the daisy chain to the first DMAPORT 2. When a DMAPORT 2 receives the token, it has the choice of either requesting access to the memory or passing the token to the next DMAPORT 2 on the daisy chain. If the DMAPORT 2 does not currently require access to the RAM it passes the token on to the next DMAPORT.

Figure 2:
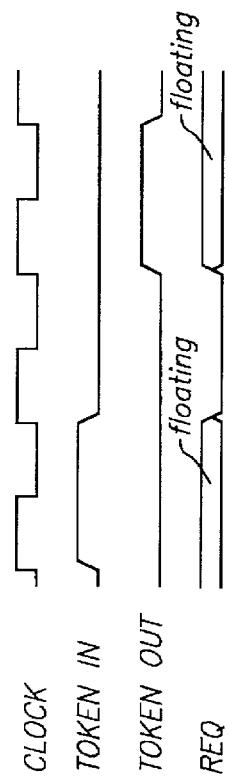
FIG. 2 is a timing diagram for a direct memory access port receiving a token and then passing it without performing any RAM accesses according to the present invention.

The timing diagram for a DMAPORT 2 receiving the token and then passing it is illustrated in FIG. 2. The DMAPORT 2 receives the token and if it does not require access to RAM, it drives REQ 3 low during the first clock cycle after receiving the token. During the second cycle after receiving the token, the current DMAPORT 2 releases the drive on REQ 3, allowing REQ to float, and driving the token out to the next DMAPORT 2.

Figure 3:
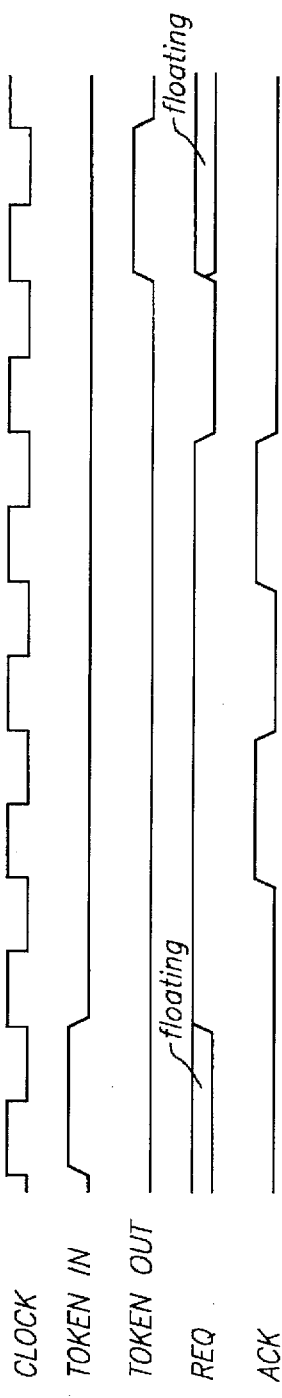
FIG. 3 is a timing diagram for a direct memory access port receiving a token, requesting two RAM accesses, then passing the token according to the present invention.

The timing diagram for a DMAPORT 2 receiving the token and then requesting access to external RAM is illustrated by FIG. 3. If the DMAPORT 2 does require RAM access when it receives the token it asserts REQ 3 during the next clock cycle after receiving the token and holds it high until that DMAPORT 2 has completed its accesses and the token is passed to the next DMAPORT 2. Every ACK 4 pulse while REQ 3 is asserted is interpreted by the DMAPORTs 2 and the DMACON 1 as a RAM access cycle for the port with the token. The DMAPORT 2 may keep the token for as many RAM cycles as it desires. To release the token the DMAPORT 2 drives REQ 3 low during the first clock cycle after any ACK 4 pulse. During the clock cycle following REQ 3 being driven low, the driver on REQ 3 should be disabled allowing the request line REQ 3 to float and the token is driven to the next DMAPORT 2. FIG. 3 shows the timing for a DMAPORT 2 receiving the token, getting two RAM accesses, and releasing the token to the next DMAPORT 2.

Figure 4:
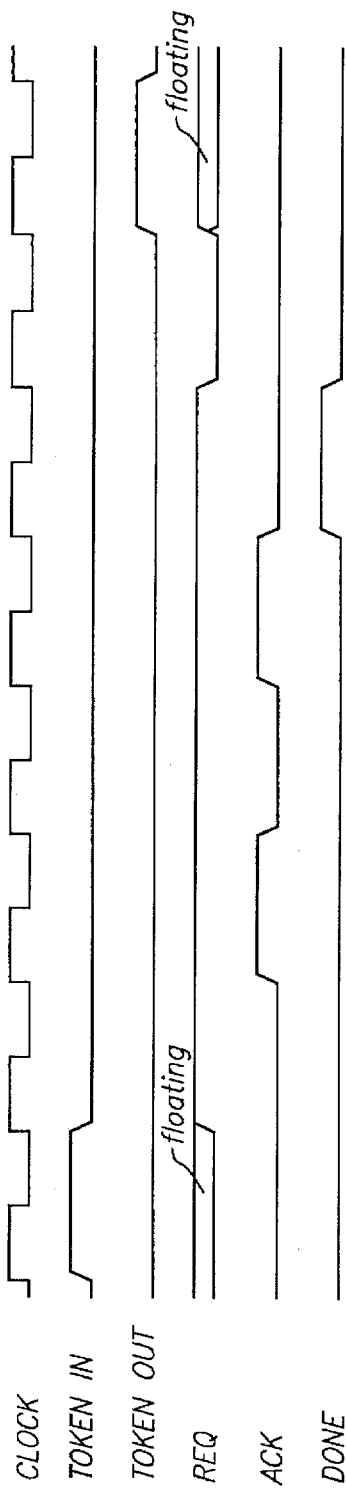
FIG. 4 is a timing diagram for a direct memory access port receiving a token, requesting two RAM accesses, the second of which is the last in the direct memory access according to the present invention.

There is one situation where the DMACON 1 will force a DMAPORT 2 to pass the token before its required transfer is complete. The DMACON 1 keeps a transfer byte count which is decremented each time a byte of data is transferred. When the transfer byte count reaches zero the direct memory access for the channel is over and the token must be passed to the next DMAPORT. The DMACON 1 indicates the end of a direct memory access by driving DONE 6 to a high potential for a single clock cycle after an ACK 4 pulse. During the clock cycle after the DONE 6 pulse, the DMAPORT 2 must drive REQ 3 low. The token is passed and the driver on REQ 3 is released during the following clock cycle allowing REQ 3 to float. A DMAPORT 2 receiving two RAM cycles, the second of which is the final byte in the direct memory access, is shown in FIG. 4.

With the DMAPORTs 2 following all the rules already outlined for the timing for REQ 3, the DMACON 1 can keep track of all token passes so that it knows which DMAPORT 2 is currently accessing the external RAM. The DMACON 1 uses a sequencer which is reset during the power-on sequence for the IC and is incremented every time that the token is passed to another DMAPORT 2.

Each DMAPORT 2 is allowed to define its own rules for how long it will keep the token before it passes the token to the next DMAPORT 2. The rules that a DMAPORT 2 can choose from are to keep the token for only one RAM access, to perform as many RAM accesses as possible while holding the token only a preprogrammed number of clock cycles, or to fill or empty local memory storage that is connected to the DMAPORT 2. This local memory storage is a first-in first-out stack that is connected to the DMAPORT 2 and can be filled or emptied according to the direction of the transfer that the DMAPORT 2 requests.

Figure 5:
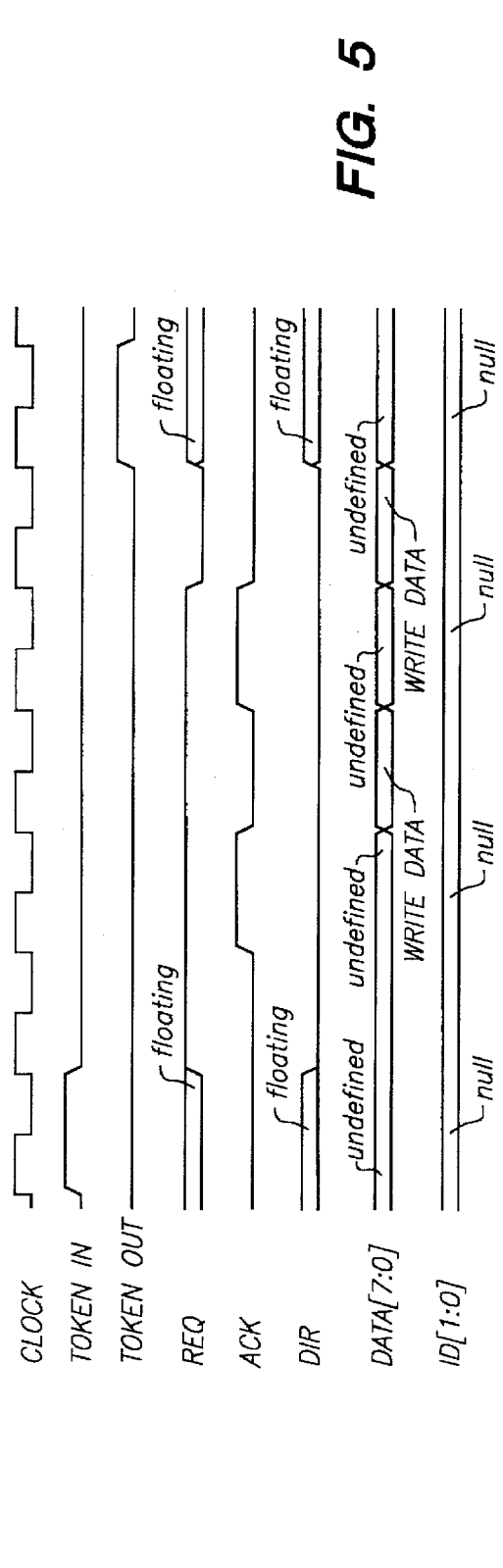
FIG. 5 is a timing diagram for a direct memory access port receiving a token, requesting two writes to RAM, then passing the token according to the present invention.

FIG. 5 illustrates the timing diagram for a DMAPORT 2 writing two bytes of data to external RAM. When the token is passed to the DMAPORT 2, REQ 3 is driven to a high potential by the DMAPORT 2, because the DMAPORT 2 does require a memory access. Because this memory access is a write operation DIR 5 is dropped to a low potential at the same time that REQ 3 is driven high. The DMAPORT 2 continues to hold DIR 5 at a low potential until the clock cycle when the token is passed. Simultaneous to the release of the REQ driver by the DMAPORT 2, the DIR driver is disabled allowing both REQ 3 and DIR 5 to float. The data bytes to be written to the RAM are driven on to the data bus 7 one at a time following each of the ACK 4 pulses. The only time that a DMAPORT 2 is allowed to drive the data bus 7 is during the clock cycle following ACK 4 dropping from a high potential to a low potential.

There is a latency inherent to any integrated circuit reading an external RAM because of the nature of the memory. This latency complicates a DMAPORT's reading of data from the external memory. The present direct memory access system has at most a three stage pipe line delay in the read operation. The DMACON 1 adds two pipe line delays to allow time for the calculation of the external RAM addresses where the data is to be read from. The sequencer that performs the RAM access adds the third stage of pipe line delay while waiting for the requested byte of data to return from the external RAM.

The latency in a read operation is seen by the DMAPORT 2 as the delay between the clock cycle during which both REQ 3 and ACK 4 are high, and the arrival of a byte of data from the external memory. To account for the fact that the DMAPORT 2 requesting the read operation may have already passed the token before the data arrives from the external memory, a DMAPORT 2 must be able to retrieve data from the data bus 7 irrespective of the position of the token. Because the DMAPORT 2 requesting the read operation may not still have the token when the data is transmitted from the external memory, the DMAPORT's 2 identification number is put on the ID bus 8 and sent along with the data byte on the data bus 7. When a DMAPORT 2 sees its identification number on ID 8, it latches the data from the data bus 7.

Figure 6:
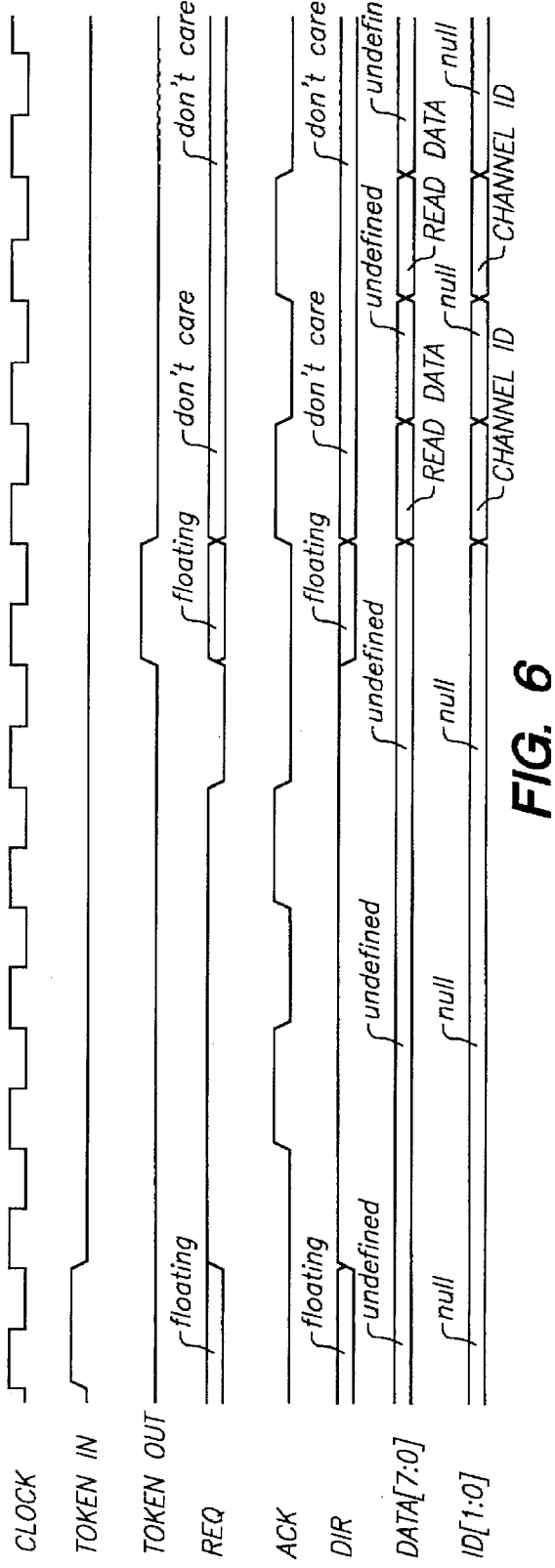
FIG. 6 is a timing diagram for a direct memory access port receiving a token, requesting two reads from RAM, passing the token, then receiving the requested bytes according to the present invention.

The timing diagram for a read operation by a DMAPORT 2 is illustrated in FIG. 6. When the token is passed to the DMAPORT 2 it drives REQ 3 to a high potential because it does need to execute data transfers. Because the RAM accesses which the DMAPORT 2 requires are read operations, DIR 5 is driven to a high potential by the current DMAPORT 2. Two ACK 4 pulses are generated while the DMAPORT 2 performs the two read operations. Due to the latency of reading from any external device the data can not be sent when it is requested and the DMAPORT 2 may have passed the token to the next DMAPORT 2 before it receives the data it requested. To insure that the data will go to the DMAPORT 2 that requested it, that DMAPORT's identification number is sent on the ID bus 8 at the same time the data is sent on the data bus 7. Read operations only occur during the clock cycle following ACK 4 rising from a low potential to a high potential so the requested data bytes are driven on to the data bus 7 during the next two ACK 4 pulses and the identification number of the requesting DMAPORT 2 is driven onto the ID bus 8 at the same time. The requesting DMAPORT 2 will latch the data from the data bus 7 when it sees its identification number on the ID bus 8.

The time-multiplexing scheme used, based on the timing of ACK 4 allows both read and write data bytes to be carried by the data bus 7. Data that is read from the external memory and transmitted to a DMAPORT 2 is only allowed on the data bus 7 during the clock cycle following ACK 4 rising from a low potential to a high potential. Data that is transmitted from a DMAPORT 2 that is to be written to the external memory is only allowed on the data bus 7 during the clock cycle following ACK 4 falling from a high potential to a low potential.

The architecture of this direct memory access data transfer system is very extensible. All that is required to add additional DMAPORTs 2 is to add additional states to the DMACON's 1 sequencer and to add enough lines to the ID bus 8 so that it can fully represent the binary identification number of each DMAPORT 2.

The present invention is described above relative to the preferred embodiment. Modifications that occur to one of ordinary skill in the art after reading this disclosure are deemed within the spirit and scope of the invention.

What is claimed is:

1. A direct memory access data transfer system in an integrated circuit for bi-directionally transferring data between a first plurality of I/O devices and an external RAM comprising:

a. a first plurality of ports, each port of equal priority and coupled to an I/O device and to each remaining port within the first plurality;

b. a single controller coupled to each port and to the external RAM;

c. a second plurality of signal lines coupled to the controller and to each port, said second plurality of signal lines including a request signal line, an acknowledge signal line, a direction signal line, a done signal line, a data bus containing a third plurality of signal lines and an identification number bus containing a fourth plurality of signal lines, and d. means for generating a token signal and passing said token signal to each port in turn, wherein the port having the token signal has sole access to the external RAM for bi-directionally transferring data between itself and the external RAM.

2. The direct memory access data transfer system as claimed in claim 1 wherein the data bus is used to reciprocally transfer data between each of the first plurality of ports and the external RAM wherein data that is read from the external RAM is transferred to the first plurality of ports on the data bus during a clock cycle after the acknowledge signal line changes from a first binary state to a second binary state and data that is to be written to the external RAM is transferred from the first plurality of ports on the data bus during a clock cycle after the acknowledge signal line changes from the second binary state to the first binary state.

3. The direct memory access data transfer system as claimed in claim 2 wherein each port is identical except as to its representative identification number which is a binary representation of the port's identification number, programmed by connections to either power or ground.

4. The direct memory access data transfer system as claimed in claim 1 wherein additional ports may subsequently be added to the data transfer system and further where the identification number bus contains enough lines to fully represent the binary representation of all of the first plurality of ports.

5. The direct memory access data transfer system as claimed in claim 1 wherein the direction signal line is used to indicate whether the port accessing the external RAM is requesting a read operation or a write operation, the direction signal line having a first binary state for signifying a write operation and a second binary state for signifying a read operation.

6. The direct memory access data transfer system as claimed in claim 1 wherein the controller maintains external RAM addresses for each of the plurality of ports to access the external RAM.

7. The direct memory access data transfer system as claimed in claim 1 wherein the port having the token possesses the token for a period determined in the port having the token.

8. A direct memory access data transfer system for accessing a memory, comprising:

a. a plurality of ports, each port coupled to a device requiring access to the memory; and b. a memory access controller for bi-directionally transferring data between each of the plurality of ports and the memory, wherein the memory access controller is coupled between the memory and each of the plurality of ports, wherein each of the plurality of ports has equal priority for initiating access to the memory and wherein each of the plurality of ports selectively initiates access to the memory through the memory access controller upon taking possession of a token and passes the token to a next one of the plurality of ports according to memory access requirements of the device coupled to the port in possession of the token.

9. The memory access data transfer system as claimed in claim 8 wherein the memory access controller forces the token to be passed upon expiration of a maximum transfer count.

10. The direct memory access data transfer system as claimed in claim 8 wherein the token is passed between adjacent ones of the plurality of ports over a dedicated token signal line coupled between the adjacent ones of the plurality of ports.

11. The direct memory access data transfer system as claimed in claim 10 wherein a first one of the plurality of ports to receive the token receives the token from the memory access controller.

12. The direct memory access data transfer system as claimed in claim 11 wherein a last one of the plurality of ports to receive the token passes the token to the memory access controller.

13. The direct memory access data transfer system as claimed in claim 8 wherein when one of the plurality of ports initiates a read operation, the token is passed before the port receives data read from the memory.

14. The direct memory access data transfer system as claimed in claim 8 further comprising a port identification bus coupled to the memory access controller and each of the plurality of ports by a port identification bus, wherein the memory access controller identifies an appropriate one of the plurality of ports to receive data read from the memory by placing a port identification number of the appropriate port on an identification bus.

15. The direct memory access data transfer system as claimed in claim 14 wherein each port is identical except as to its port identification number.

16. The direct memory access data transfer system as claimed in claim 8 wherein the memory access controller maintains memory addresses for each of the plurality of ports to access the memory.

17. The direct memory access data transfer system as claimed in claim 8 wherein the plurality of ports and the memory access controller are contained in a single integrated circuit chip and further wherein the memory is external to the integrated circuit chip.

18. The direct memory access data transfer system as claimed in claim 8 further comprising a direction signal line coupled to the memory access controller and to each of the ports wherein a binary state of the direction signal line indicates whether a memory access is a read operation or a write operation.

19. The direct memory access data transfer system as claimed in claim 8 wherein the memory access controller is coupled to each of the ports by a data bus and wherein the direct memory access data transfer system further comprises a request signal line, an acknowledge signal line, a done signal line, a direction signal line and an identification number bus.

20. The direct memory access data transfer system as claimed in claim 19 wherein data that is read from the external RAM is transferred on the data bus after the acknowledge signal line changes from a first binary state to a second binary state and data that is to be written to the external RAM is transferred on the data bus after the acknowledge signal line changes from the second binary state to the first binary state.

21. A direct memory access data transfer system for accessing a memory comprising:
a. a plurality of ports, each port coupled to a device requiring access to the memory; and b. a memory access controller for bi-directionally transferring data between each of the plurality of ports and the memory, wherein the memory access controller is coupled to the memory and to each of the plurality of ports, wherein when a port of the plurality initiates a read operation, the token is passed to a next one of the plurality before the port that initiated the read operation receives data read from the memory.

22. The memory access data transfer system as claimed in claim 21 wherein the memory access controller forces the token to be passed upon expiration of a maximum transfer count.

23. The direct memory access data transfer system as claimed in claim 21 wherein the token is passed between adjacent ones of the plurality of ports over a dedicated token signal line coupled between the adjacent ones of the plurality of ports.

24. The direct memory access data transfer system as claimed in claim 23 wherein a first one of the plurality of ports to receive the token receives the token from the memory access controller.

25. The direct memory access data transfer system as claimed in claim 24 wherein a last one of the plurality of ports to receive the token passes the token to the memory access controller.

26. The direct memory access data transfer system as claimed in claim 21 further comprising a port identification bus coupled to memory access controller and each of the plurality of ports by a port identification bus, wherein the memory access controller identifies an appropriate one of the plurality of ports to receive data read from the memory by placing a port identification number of the appropriate port on an identification bus.

27. The direct memory access data transfer system as claimed in claim 26 wherein each port is identical except as to its port identification number.

28. The direct memory access data transfer system as claimed in claim 21 wherein the memory access controller maintains memory addresses for each of the plurality of ports to access the memory.

29. The direct memory access data transfer system as claimed in claim 21 wherein the plurality of ports and the memory access controller are contained in a single integrated circuit chip and further wherein the memory is external to the integrated circuit chip.

30. The direct memory access data transfer system as claimed in claim 21 further comprising a direction signal line coupled to the memory access controller and to each of the ports wherein a binary state of the direction signal line indicates whether a memory access is a read operation or a write operation.

31. The direct memory access data transfer system as claimed in claim 21 wherein the memory access controller is coupled to each of the ports by a data bus and wherein the direct memory access data transfer system further comprises a request signal line, an acknowledge signal line, a done signal line, a direction signal line and an identification number bus.

32. The direct memory access data transfer system as claimed in claim 31 wherein data that is read from the external RAM is transferred on the data bus after the acknowledge signal line changes from a first binary state to a second binary state and data that is to be written to the external RAM is transferred on the data bus after the acknowledge signal line changes from the second binary state to the first binary state.

* * * * *

UNITED STATES PATENT AND TRADEMARK OFFICE
CERTIFICATE OF CORRECTION

PATENT NO. : 5,734,926

DATED : March 31, 1998

INVENTOR(S) : Peter Feeley et al.

It is certified that error appears in the above-identified patent and that said Letters Patent is hereby correct as shown below:

Column 2, lines 18, after "bus." insert --In other words, the bus is bi-directional so that data may be transferred in both directions.--.

Column 6, line 19 and 20, delete "used to reciprocally" and insert --used to bi-directionally--.

Column 6, line 36, delete "claim 1" and insert --claim 3--.

Signed and Sealed this

Fourteenth Day of July, 1998

Attest:

BRUCE LEHMAN

*Attesting Officer*   *Commissioner of Patents and Trademarks*